United States Patent
Hahn et al.

(10) Patent No.: US 11,674,409 B2
(45) Date of Patent: Jun. 13, 2023

(54) TURBOCHARGER WITH VANED TURBINE NOZZLE, AND METHOD OF ASSEMBLING SAME

(71) Applicant: Garrett Transportation I Inc., Torrance, CA (US)

(72) Inventors: Stanislav Hahn, Brno (CZ); Jan Kohoutek, Brno (CZ); Jakub Kriz, Brno (CZ); Antonin Forbelsky, Blansko (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/301,295

(22) Filed: Mar. 31, 2021

(65) Prior Publication Data

US 2022/0316355 A1 Oct. 6, 2022

(51) Int. Cl.
*F01D 17/16* (2006.01)
*F01D 25/14* (2006.01)

(52) U.S. Cl.
CPC ......... *F01D 17/165* (2013.01); *F01D 25/145* (2013.01); *F05D 2220/40* (2013.01)

(58) Field of Classification Search
CPC ............. F01D 25/145; F02C 6/12; F02C 7/24
See application file for complete search history.

(56) References Cited

U.S. PATENT DOCUMENTS

| | | | | |
|---|---|---|---|---|
| 6,428,293 B1 * | 8/2002 | Dewar | ............. | F04C 29/04 418/83 |
| 8,568,092 B2 * | 10/2013 | Matsuyama | ............ | F02B 39/00 415/177 |
| 9,683,456 B2 * | 6/2017 | Burmester | ............. | F01D 25/24 |
| 2008/0304957 A1 * | 12/2008 | Walter | ............. | F16F 1/32 415/177 |
| 2011/0014036 A1 * | 1/2011 | Boening | ................. | F02C 6/12 415/177 |

FOREIGN PATENT DOCUMENTS

| | | |
|---|---|---|
| CN | 204402584 U | 6/2015 |
| DE | 102004023284 A1 | 12/2005 |

(Continued)

OTHER PUBLICATIONS

Extended European Search Report in counterpart EP Appl. No. 22156938.7, dated Aug. 1, 2022.

*Primary Examiner* — Topaz L. Elliott
*Assistant Examiner* — Cameron A Corday
(74) *Attorney, Agent, or Firm* — John C. James

(57) ABSTRACT

A method of assembling a turbocharger having a vaned turbine nozzle includes first forming a sub-assembly of a center housing, shaft, bearings, compressor wheel, turbine wheel, and vane assembly. The vane assembly is held captive in attachment to the center housing by an annular heat shield that includes prongs or the like at its inner and outer peripheries for respectively engaging a first catch formed on the center housing and a second catch formed on the nozzle ring of the vane assembly. The heat shield forms a snap fit to the center housing and nozzle ring, thereby connecting the cartridge to the center housing. The whole sub-assembly is then joined to the turbine housing, in the process axially compressing the heat shield and a spring shroud for exerting an axial biasing force on the nozzle ring.

9 Claims, 11 Drawing Sheets

(56) References Cited

FOREIGN PATENT DOCUMENTS

| | | |
|---|---|---|
| DE | 102011114060 A1 | 3/2013 |
| DE | 102015220113 A1 | 5/2016 |
| EP | 3680456 A1 | 7/2020 |
| EP | 3795799 A1 | 3/2021 |
| JP | 2016008575 A | 1/2016 |

\* cited by examiner

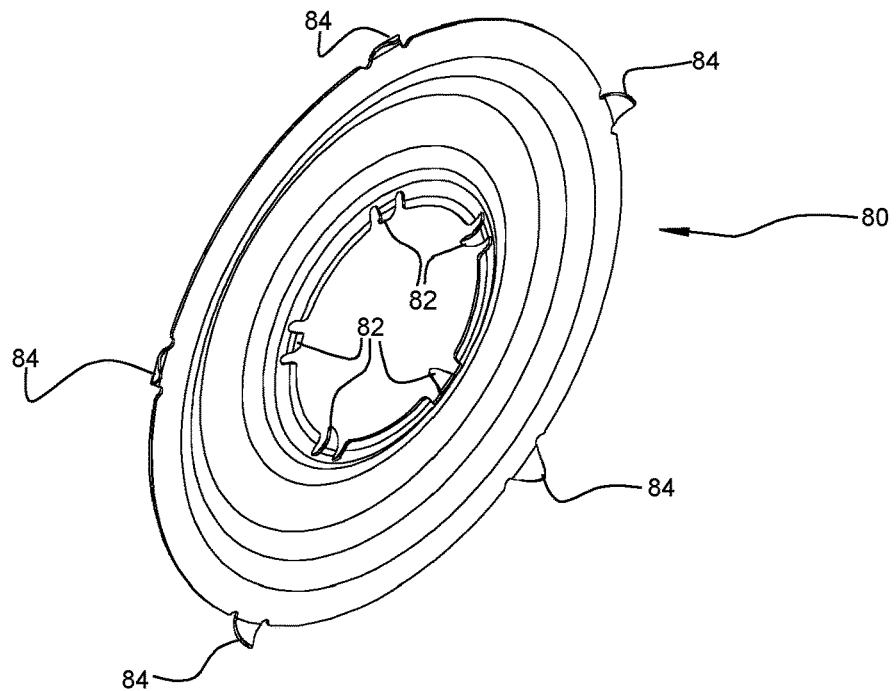
FIG. 5
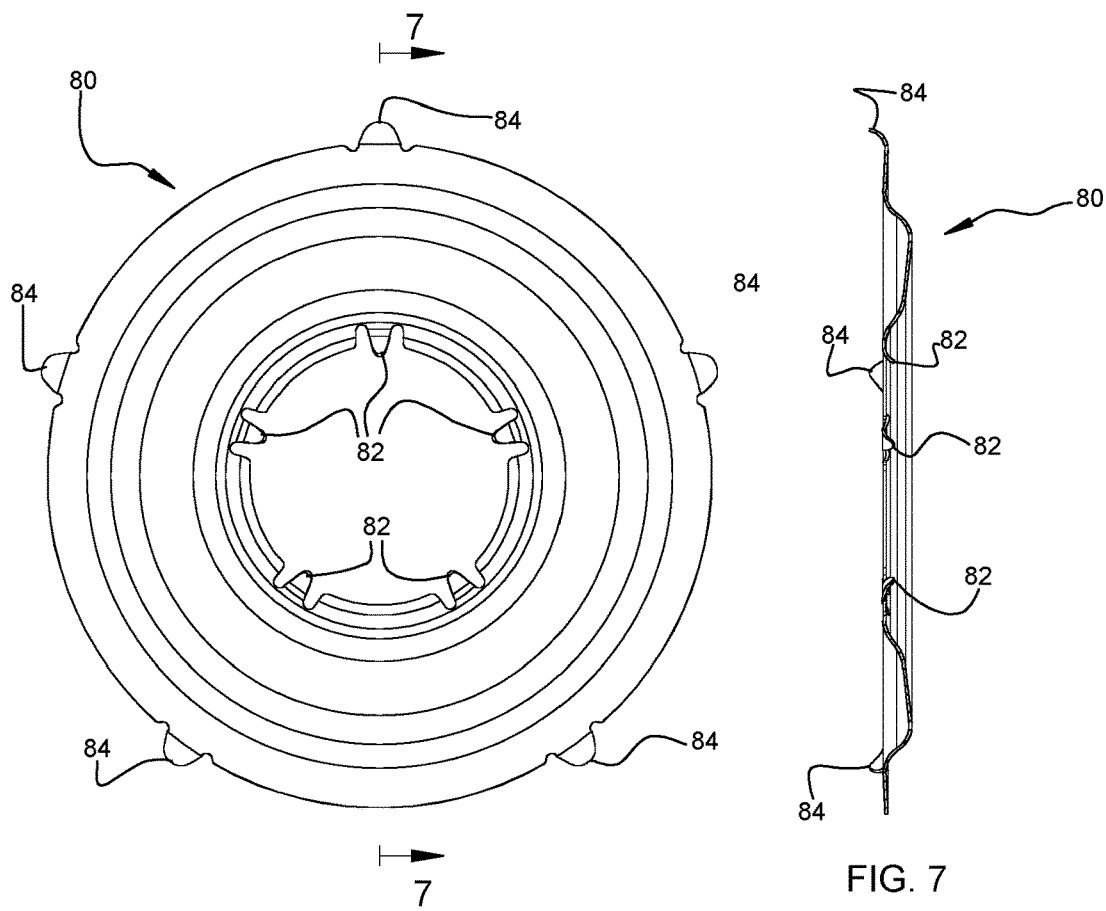
FIG. 6
FIG. 7

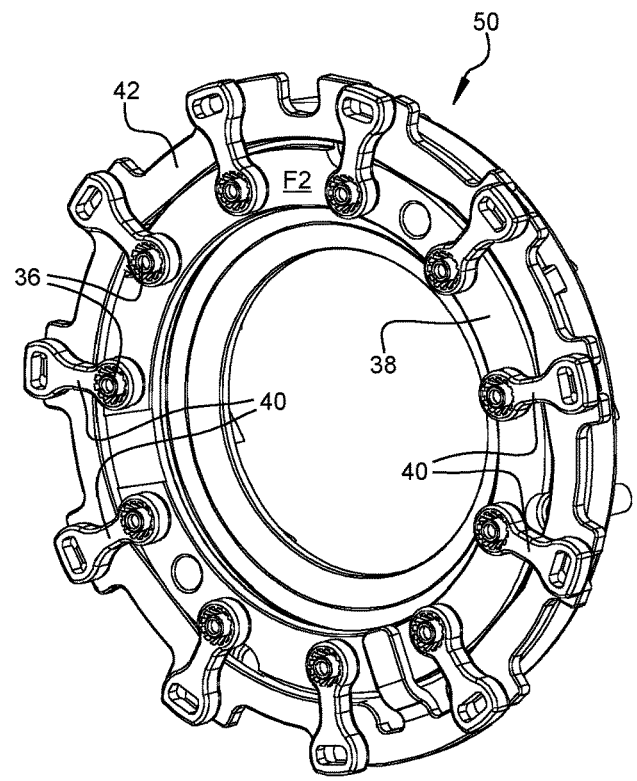
FIG. 9
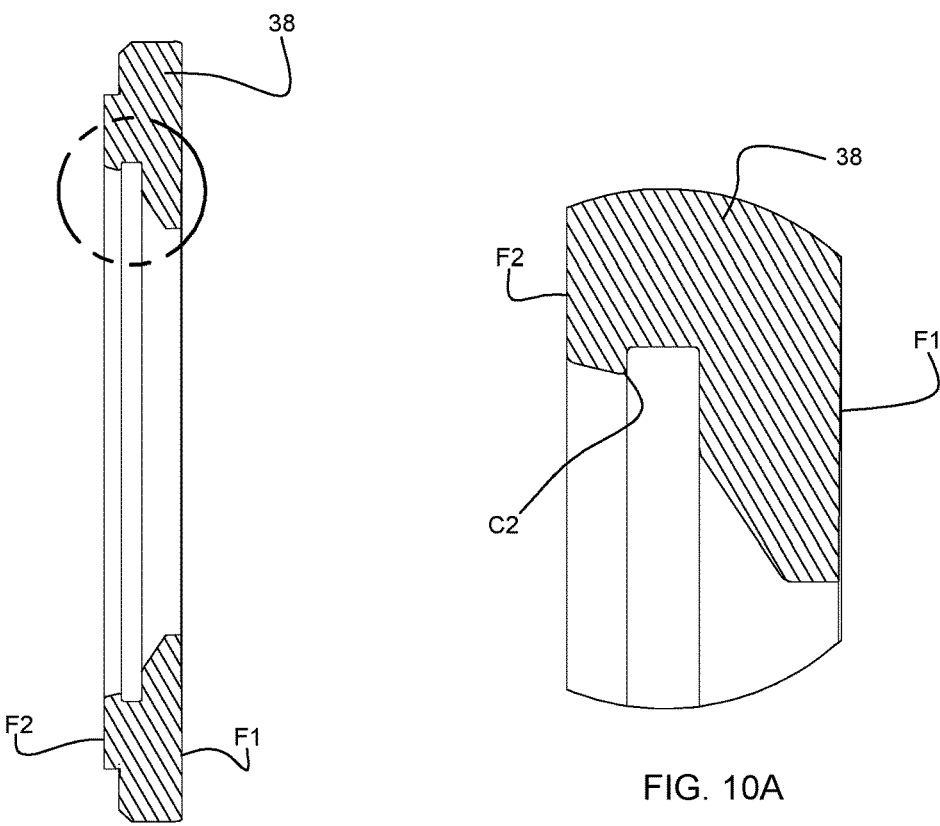
FIG. 10
FIG. 10A

TURBOCHARGER WITH VANED TURBINE NOZZLE, AND METHOD OF ASSEMBLING SAME

BACKGROUND OF THE INVENTION

The present disclosure relates to turbochargers having a turbine in which an array of vanes is disposed in the nozzle of the turbine for regulating exhaust gas flow into the turbine.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger.

One type of variable-geometry turbocharger is the variable-nozzle turbocharger (VNT), which includes an array of variable vanes in the turbine nozzle. The vanes are pivotally mounted to a nozzle ring, which forms one wall of the nozzle. The opposite wall of the nozzle is formed by a pipe or insert that fits into an axial bore of the turbine housing. The vanes are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

Alternatively, the vanes in the nozzle may be an array of fixed vanes that is installed into the turbocharger as a unit during assembly.

The present disclosure relates to turbochargers having a vaned turbine nozzle, and particularly relates to improvements in various aspects of such turbochargers that facilitate the process of assembling the turbocharger.

BRIEF SUMMARY OF THE DISCLOSURE

In accordance with one aspect of the invention, a method of assembling a turbocharger having a vaned turbine nozzle is described herein, and the corresponding structures that enable the assembly method are detailed. In accordance with one embodiment, a method of assembling such a turbocharger comprises the steps of:

providing a rotor assembly comprising a center housing defining a central bore extending therethrough and having bearings housed within the bore, a shaft rotatably supported by the bearings and having a first end extending out from one end of the bore and an opposite second end extending out from an opposite end of the bore, a compressor wheel connected to the first end of the shaft, and a turbine wheel connected to the second end of the shaft, wherein the center housing defines a nose portion at said opposite end of the bore, the nose portion defining a radially outer peripheral surface and a first catch projecting radially outwardly from said radially outer peripheral surface;

providing a vane assembly comprising a generally annular nozzle ring and an array of circumferentially spaced vanes adjacent a first face of the nozzle ring, wherein the nozzle ring defines a radially inner peripheral surface and a second catch projecting radially inwardly from said radially inner peripheral surface adjacent said second face of the nozzle ring;

providing an annular heat shield having an inner periphery and an outer periphery;

forming a snap fit between the inner periphery of the heat shield and the first catch on the nose of the center housing so as to form a captive connection of the heat shield to the center housing;

forming a snap fit between the outer periphery of the heat shield and the second catch on the nozzle ring so as to form a captive connection of the variable-vane assembly to the center housing, thereby forming a rotor-and-vane assembly comprising the rotor assembly coupled with the vane assembly; and moving the rotor-and-vane assembly as a unit toward a turbine housing defining a receptacle, so as to move the turbine wheel into the receptacle in the turbine housing, and fastening the rotor-and-vane assembly to the turbine housing.

In one embodiment, prior to the forming steps, an annular spring shroud can be positioned between the heat shield and an axially facing surface of the center housing. Accordingly, the forming steps result in the spring shroud being captively retained between the heat shield and said axially facing surface of the center housing. Subsequently, the moving step can cause said axially facing surface of the center housing to engage and axially bias an inner peripheral region of the spring shroud toward the turbine housing so as to cause an outer peripheral region of the spring shroud to engage and axially bias an outer peripheral region of the heat shield against a surface of the nozzle ring such that the spring shroud and the heat shield are axially compressed between the center housing and the nozzle ring.

In accordance with one embodiment, the moving step comprises orienting the turbine housing with the receptacle facing upward and orienting the rotor-and-vane assembly vertically with the turbine wheel facing downward and spaced above the turbine housing, and lowering the rotor-and-vane assembly until the turbine is disposed within the receptacle.

In one embodiment, the vane assembly comprises a variable-vane assembly. Each vane is rotatably mounted to the nozzle ring, and a rotatable unison ring is disposed adjacent a second face of the nozzle ring opposite from the first face, with linkages connecting each vane to the unison ring such that rotation of the unison ring rotates the vanes about respective pivot axes thereof.

A turbocharger in accordance with one embodiment of the invention comprises a rotor assembly comprising a center housing defining a central bore extending therethrough and having bearings housed within the bore, a shaft rotatably supported by the bearings and having a first end extending out from one end of the bore and an opposite second end extending out from an opposite end of the bore, a compressor wheel connected to the first end of the shaft, and a turbine wheel connected to the second end of the shaft, wherein the center housing defines a nose portion at said opposite end of the bore, the nose portion defining a radially outer peripheral surface and a first catch projecting radially outwardly from said radially outer peripheral surface. The turbocharger further comprises a vane assembly comprising a generally annular nozzle ring and an array of circumferentially spaced vanes adjacent a first face of the nozzle ring. The nozzle ring defines a radially inner peripheral surface and a second catch projecting radially inwardly from said radially inner peripheral surface adjacent said second face of the nozzle ring.

An annular heat shield is included, having an inner periphery and an outer periphery. The inner periphery of the heat shield engages the first catch on the nose of the center housing in a snap fit therebetween so as to form a captive connection of the heat shield to the center housing, and the outer periphery of the heat shield engages the second catch on the nozzle ring in a snap fit therebetween so as to form a captive connection of the vane assembly to the center housing.

The turbocharger further comprises a turbine housing fastened to the center housing, and defining a receptacle within which the turbine wheel is disposed.

In one embodiment, the inner periphery of the heat shield defines a plurality of circumferentially spaced first prongs that form the snap fit with the first catch on the center housing. The outer periphery of the heat shield defines a plurality of circumferentially spaced second prongs that form the snap fit with the second catch on the nozzle ring.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 is an isometric view of a heat shield in accordance with an embodiment of the invention;

FIG. 6 is a front view of the heat shield;

FIG. 7 is a cross-sectional view of the heat shield along line 7-7 in FIG. 6;

FIG. 9 is an isometric view of a variable vane cartridge, showing one side having the vane arms;

FIG. 10 is a cross-sectional view of the nozzle ring of the variable vane cartridge in isolation;

FIG. 10A is a magnified portion of FIG. 10, detailing the catch for engaging the outer periphery of the heat shield in a snap fit;

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
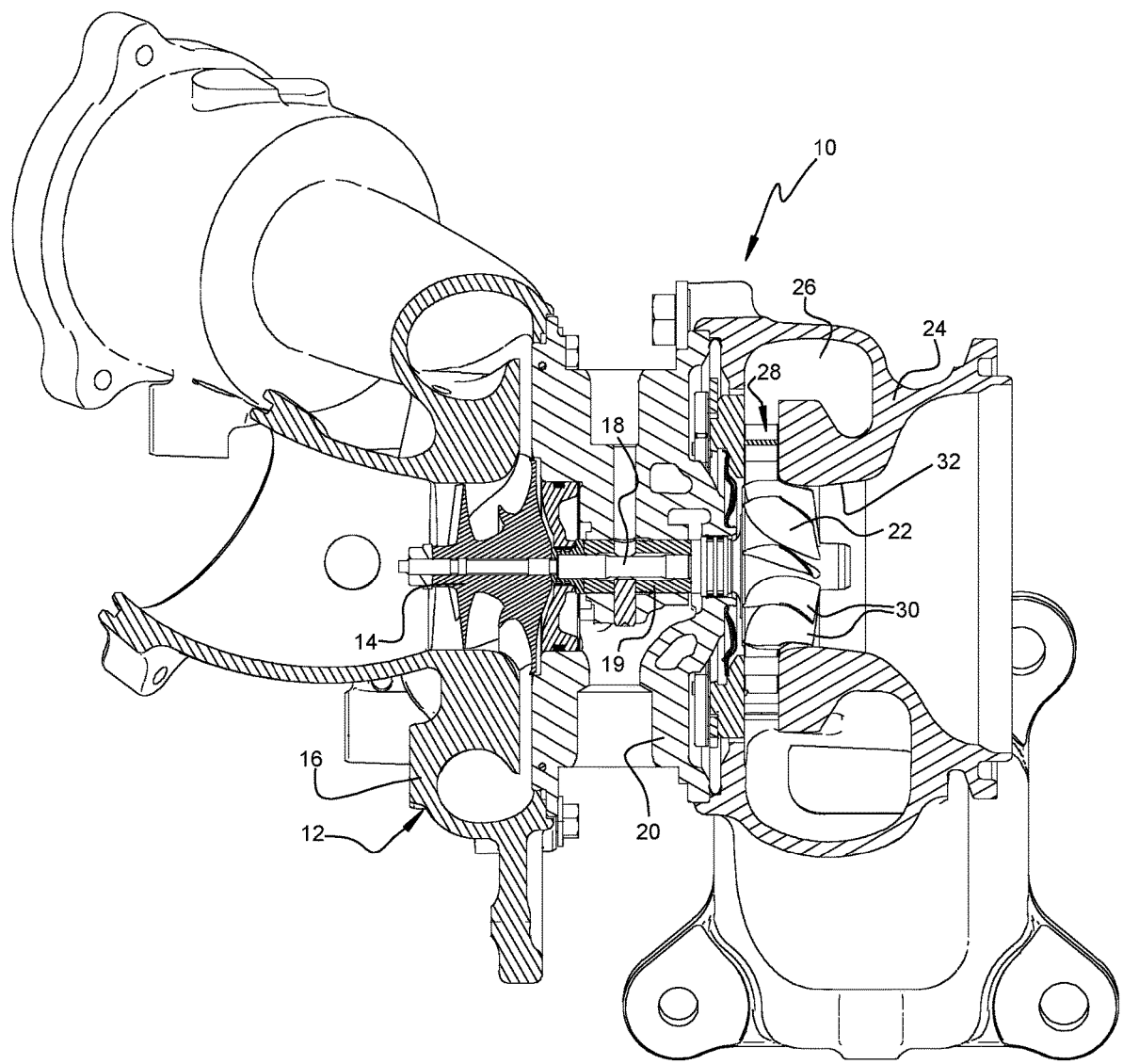
FIG. 1 is a cross-sectional view of a turbocharger in accordance with one embodiment of the invention.

A turbocharger 10 in accordance with one embodiment of the invention is illustrated in cross-sectional view in FIG. 1. The turbocharger comprises a compressor 12 having a compressor wheel or impeller 14 mounted in a compressor housing 16 on one end of a rotatable shaft 18. The shaft is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to the intake of an internal combustion engine (not shown) for boosting the performance of the engine.

The turbocharger also includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flow through the passages between the blades 30 of the turbine wheel, the gas is expanded to a lower pressure, and the gas discharged from the wheel exits the turbine housing through a generally axial bore 32 therein.

Figure 2:
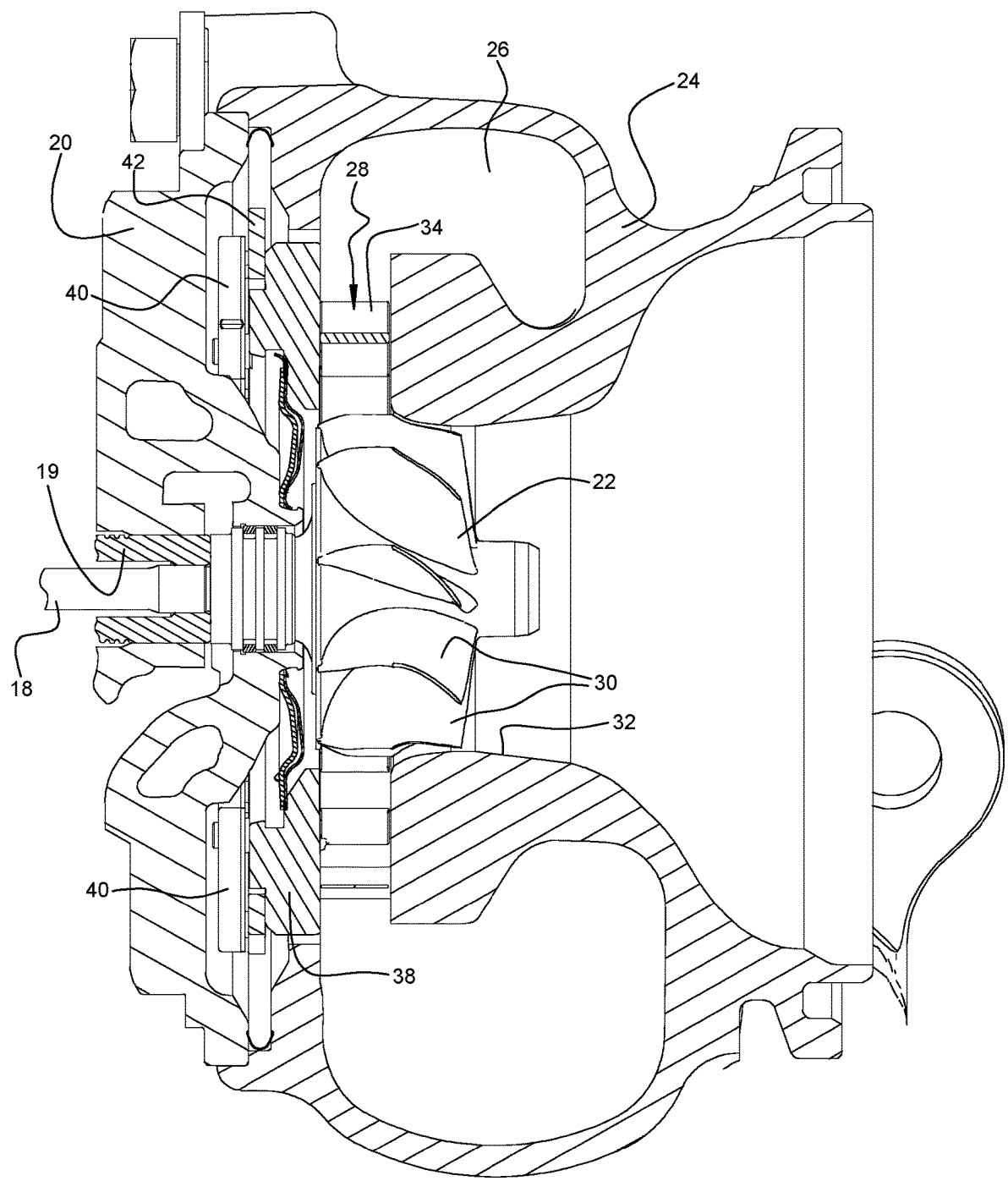
FIG. 2 is a magnified portion of FIG. 1.

The turbine nozzle 28 is a variable nozzle for varying the cross-sectional flow area through the nozzle so as to regulate flow into the turbine wheel. With reference to FIGS. 2, 9, and 10, the nozzle includes a plurality of vanes 34 that are circumferentially spaced about the nozzle. Each vane is affixed to an axle 36 that passes through an aperture in a generally annular nozzle ring 38 that is mounted coaxially with respect to the turbine wheel 22. Each axle 36 is rotatable about its axis for rotating the attached vane. The nozzle ring 38 forms one wall of the flow passage of the nozzle 28, and in the illustrated embodiment the opposite wall of the nozzle is formed by a part of the turbine housing 24; however, alternatively, the opposite wall of the nozzle can be formed by a separate annular insert or by a pipe having a tubular portion received into the central axial bore in the turbine housing and having a flange portion that extends radially out from one end of the tubular portion and forms the nozzle wall.

Each of the axles 36 has a vane arm 40 affixed to an end of the axle that protrudes out from the nozzle ring 38, and is engaged by a generally annular unison ring 42 (also referred to herein as an unison ring) that is rotatable about its axis and that is coaxial with the nozzle ring 38. An actuator (not shown) is connected to the unison ring 42 for rotating it about its axis. When the unison ring is rotated, the vane arms are rotated to cause the axles 36 to rotate about their axes, thereby rotating the vanes 34 so as to vary the cross-sectional flow area through the nozzle 28. As described thus far, the variable nozzle mechanism generally corresponds to a conventional variable nozzle having variable vanes.

In the illustrated embodiment, the variable vane mechanism is provided in the form of a cartridge 50 that is installable into and removable from the turbocharger as a unit. The cartridge 50 comprises the nozzle ring 38, vanes 34, axles 36, vane arms, and unison ring 42. Although the provision of the cartridge 50 facilitates assembly of the turbocharger, there remains a challenge in bringing the turbine housing and center housing together with the variable vane cartridge 50 disposed therebetween. Care must be taken to avoid damage to the turbine wheel as it is inserted into the open end of the turbine housing. If the rotor assembly (center housing, compressor wheel, turbine wheel, and shaft) is supported in a vertical position with the turbine wheel at the upper end, it would be possible to then place the variable vane cartridge on top of the rotor assembly, with a suitable heat shield arranged between the center housing and the cartridge. The turbine housing could then be lowered onto the turbine wheel. This method, however, presents an unacceptably high degree of risk of damage to the turbine wheel because of the significant mass of the turbine housing and the difficulty of properly centering the open end of the turbine housing in alignment with the turbine wheel as the turbine housing is lowered into place. An assembly fixture could be designed to aid the alignment and lowering of the turbine housing, but this would entail extra cost and complexity to the assembly operation.

The present invention was conceived out of a need for a solution to the assembly issue noted above. In accordance with the present invention, the assembly of the turbocharger can be accomplished with minimal risk of damage to the turbine wheel. This is achieved by employing a special heat shield configuration, with corresponding special features on the center housing and the nozzle ring of the variable vane cartridge. These enable the cartridge to be attached to and captively retained on the center housing in the properly aligned position. This in turn facilitates a safer process for bringing the rotor assembly and turbine housing together, as described below.

Figure 3:
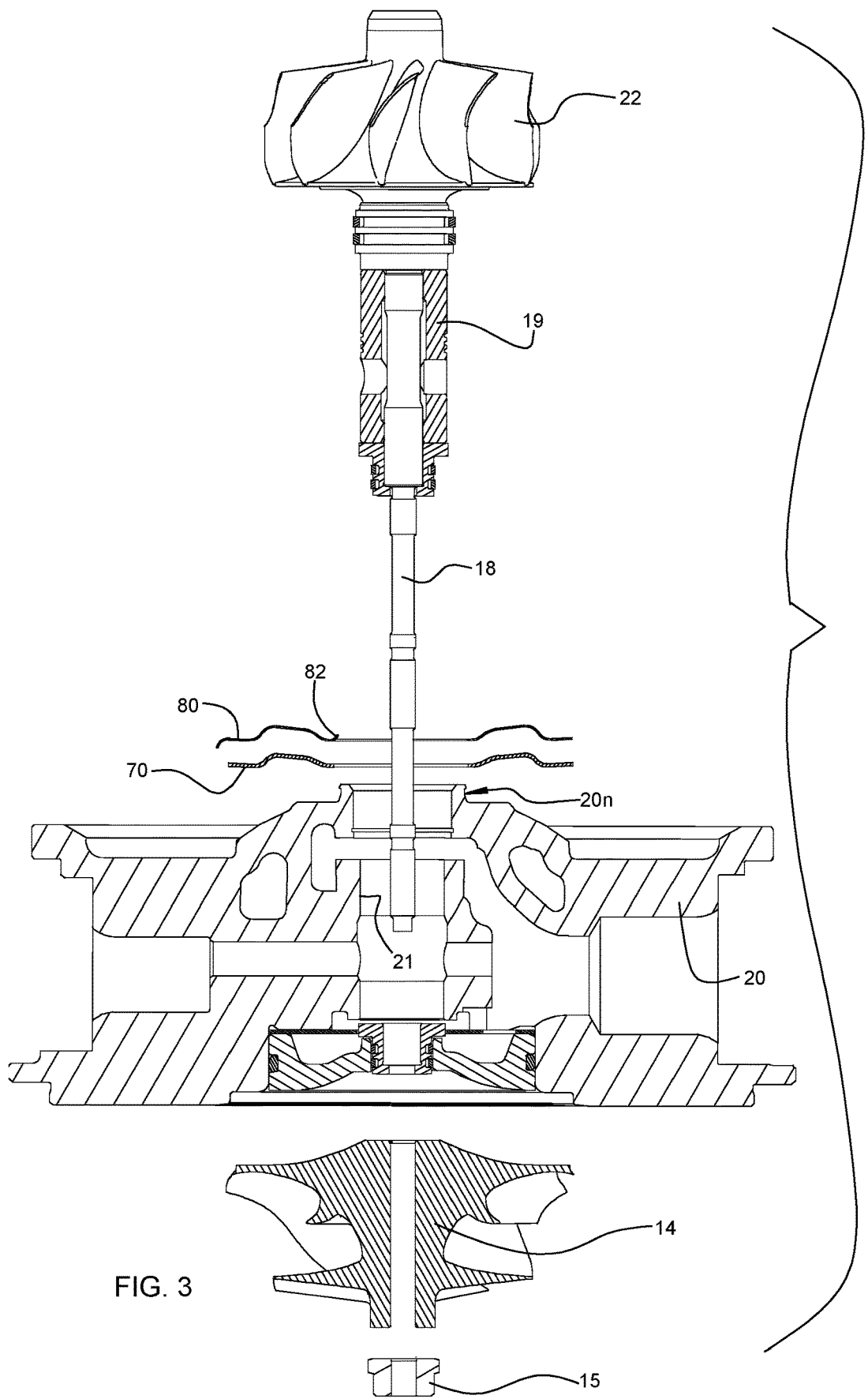
FIG. 3 is an exploded view of a subassembly comprising the turbine housing, rotor, spring shroud, and heat shield.
Figure 4:
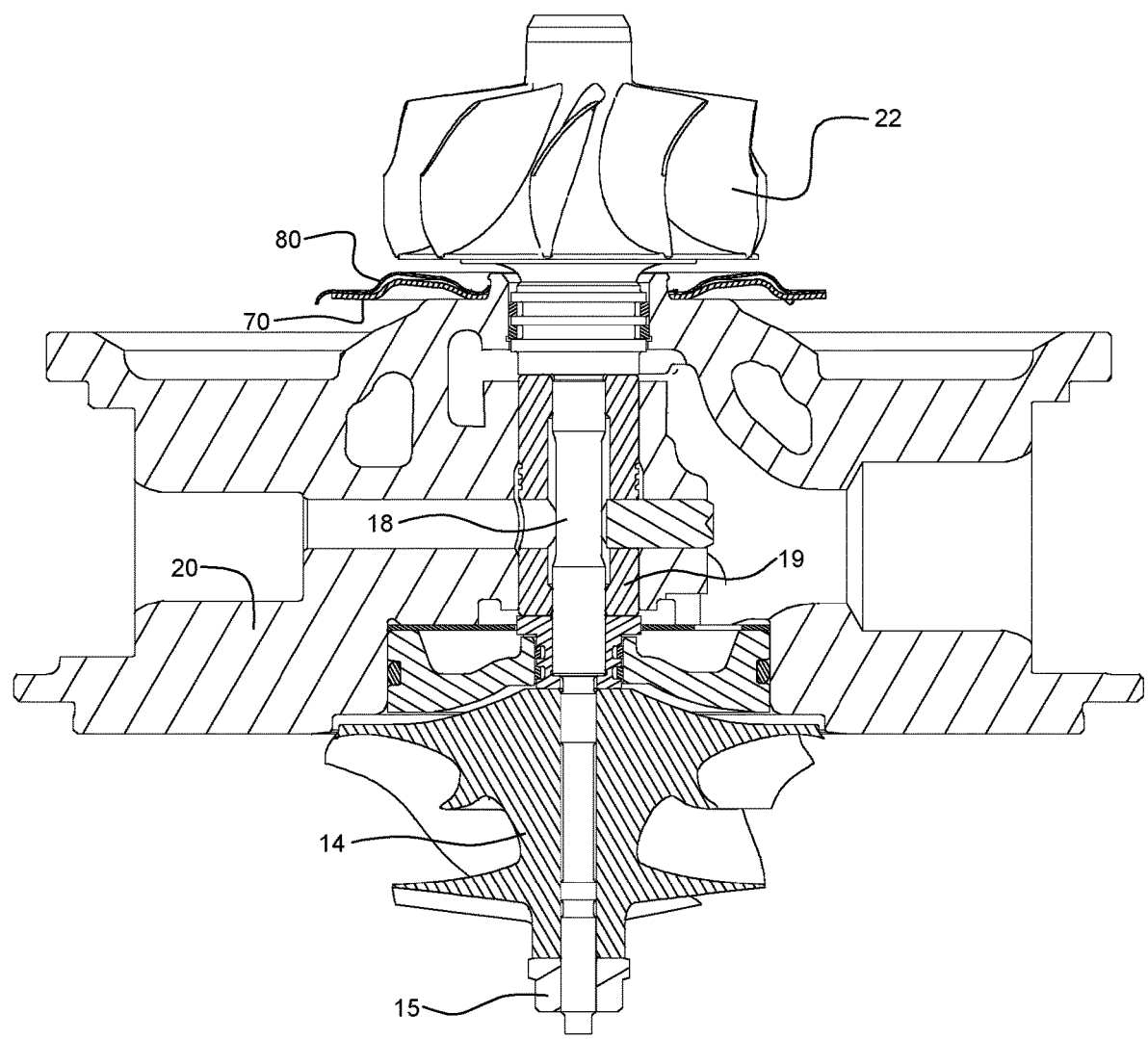
FIG. 4 is a cross-sectional view of a sub-assembly comprising the turbine housing, rotor assembly (turbine wheel, shaft, and compressor wheel), spring shroud, and heat shield.

With reference to FIG. 3, a sub-assembly is illustrated in exploded view to explain how it is assembled. The sub-assembly comprises the center housing 20, the compressor wheel 14, the shaft 18 and bearings 19, the turbine wheel 22, an annular spring shroud 70, and an annular heat shield 80. The center housing defines a through bore 21 that is generally cylindrical, having a diameter slightly greater than the outer diameter of the bearings 19 for the shaft 18. The turbine wheel 22 is affixed to one end of the shaft, and the bearings are sleeved over the shaft from its opposite end. The center housing defines a nose portion 20n comprising a short generally cylindrical projection at the side of the center housing facing the turbine wheel. The inner diameter of the spring shroud 70 is greater than the outer diameter of the nose portion of the center housing. The inner periphery of the heat shield 80 is generally circular and of greater diameter than the OD of the nose portion, but there are prongs 82 projecting from the inner periphery that extend to a slightly smaller diameter than the nose portion, as further described below. The heat shield thus can be snapped over the nose portion so that it is retained on the center housing, with the spring shroud disposed between the center housing and the heat shield. The assembly of the turbine wheel, shaft, and bearings is then inserted into the center housing so that the free end of the shaft passes through the center housing bore. The compressor wheel is then affixed to the shaft via a nut 15. FIG. 4 shows the completed sub-assembly.

Figure 8:
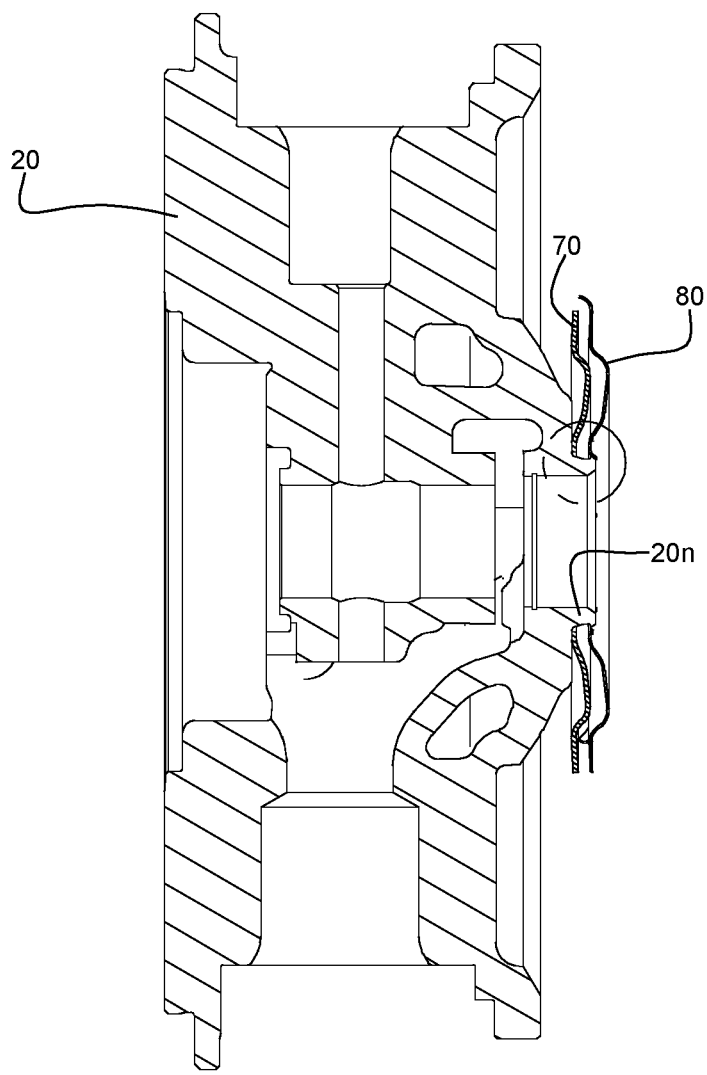
FIG. 8 is a cross-sectional view of the turbine housing having the spring shroud and the heat shield positioned and ready to be installed thereon.
Figure 8A:
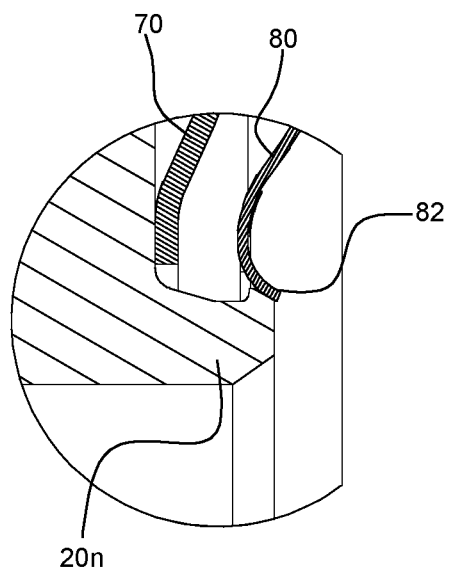
FIG. 8A is a magnified portion of FIG. 8 showing the heat shield prior to being pushed onto the center housing to snap it in place.
Figure 8B:
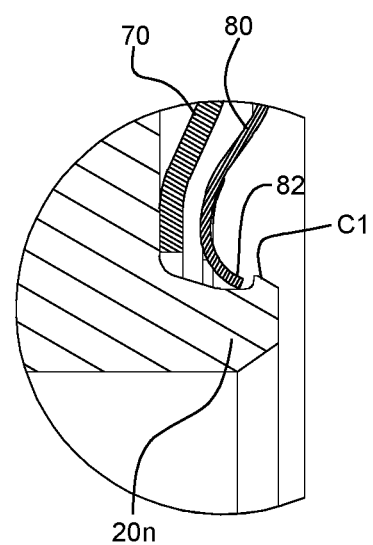
FIG. 8B is similar to FIG. 8A but shows the heat shield after being snapped in place.

With reference to FIGS. 5, 6, 7, 8, 8A, and 8B, the structure of the heat shield 80 and its cooperation with the center housing are now explained. As noted, the center housing defines a nose portion 20n that is a generally cylindrical feature projecting a short distance from the face of the center housing facing the turbine wheel. The nose portion has a radially outer peripheral surface, and the end of the nose portion defines a first catch C1 that extends radially outwardly from the radially outer peripheral surface. The maximum diameter of the first catch is larger than the smallest diameter defined by the prongs 82 at the radially inner periphery of the heat shield 80. The prongs 82 are resiliently deformable. The end of the nose portion 20n defines a conical ramp surface starting from a relatively smaller diameter and proceeding to the maximum diameter of the first catch in the direction away from the turbine wheel. FIG. 8A illustrates the spring shroud 70 in place and the heat shield 80 just abutting the end of the nose portion 20n prior to being pushed onto the nose portion (to the left in FIG. 8A). Axially pushing the heat shield onto the nose portion causes the prongs 82 to be resiliently deformed radially outwardly by the ramp surface on the end of the nose portion, until the prongs clear the maximum diameter of the first catch C1, whereupon the prongs 82 return to their previous undeformed shape, thereby forming a snap-fit of the heat shield onto the nose portion of the center housing as shown in FIG. 8B.

Figure 11:
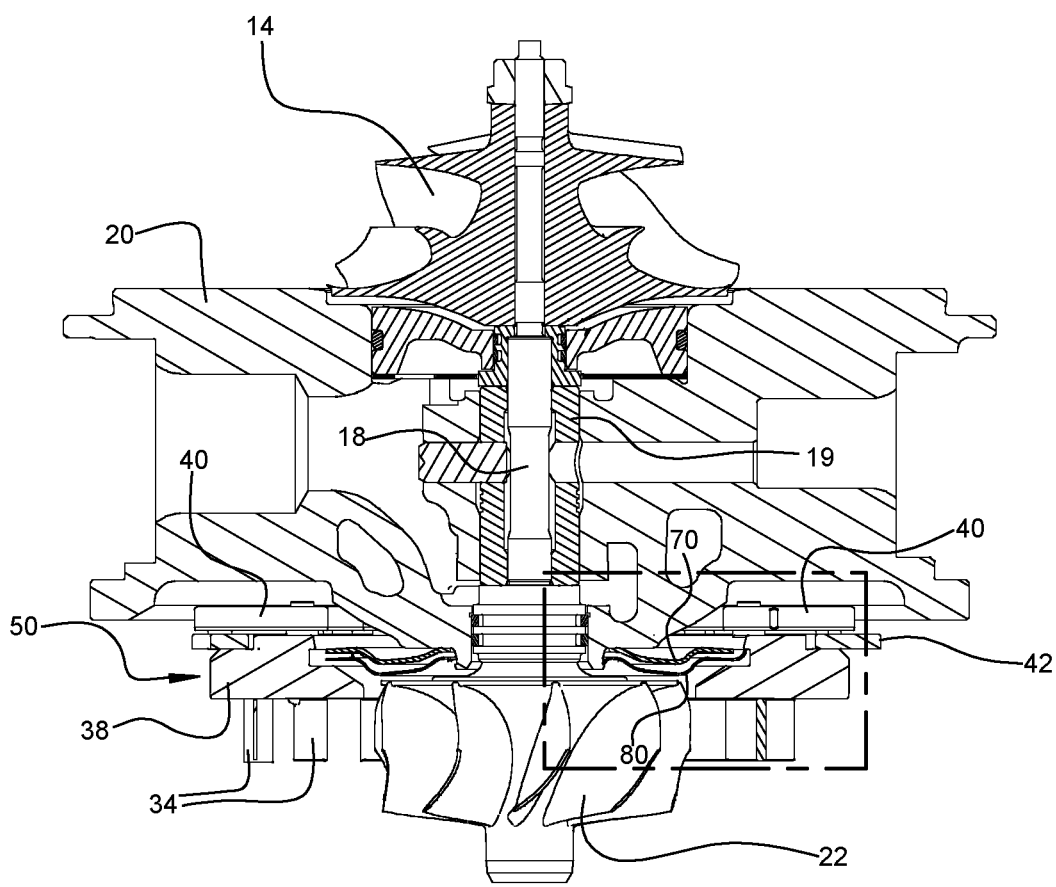
FIG. 11 illustrates a sub-assembly comprising the center housing, the rotor assembly (compressor wheel, shaft, bearings, and turbine wheel), and variable vane cartridge, after the cartridge is attached to the center housing.
Figure 11A:
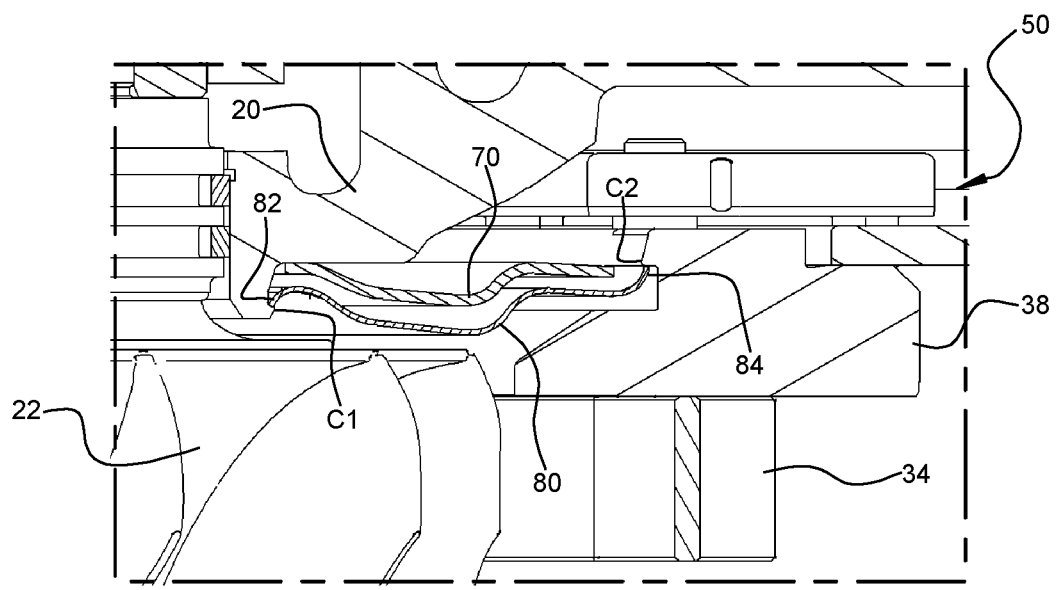
FIG. 11A is a magnified portion of FIG. 11.
Figure 12:
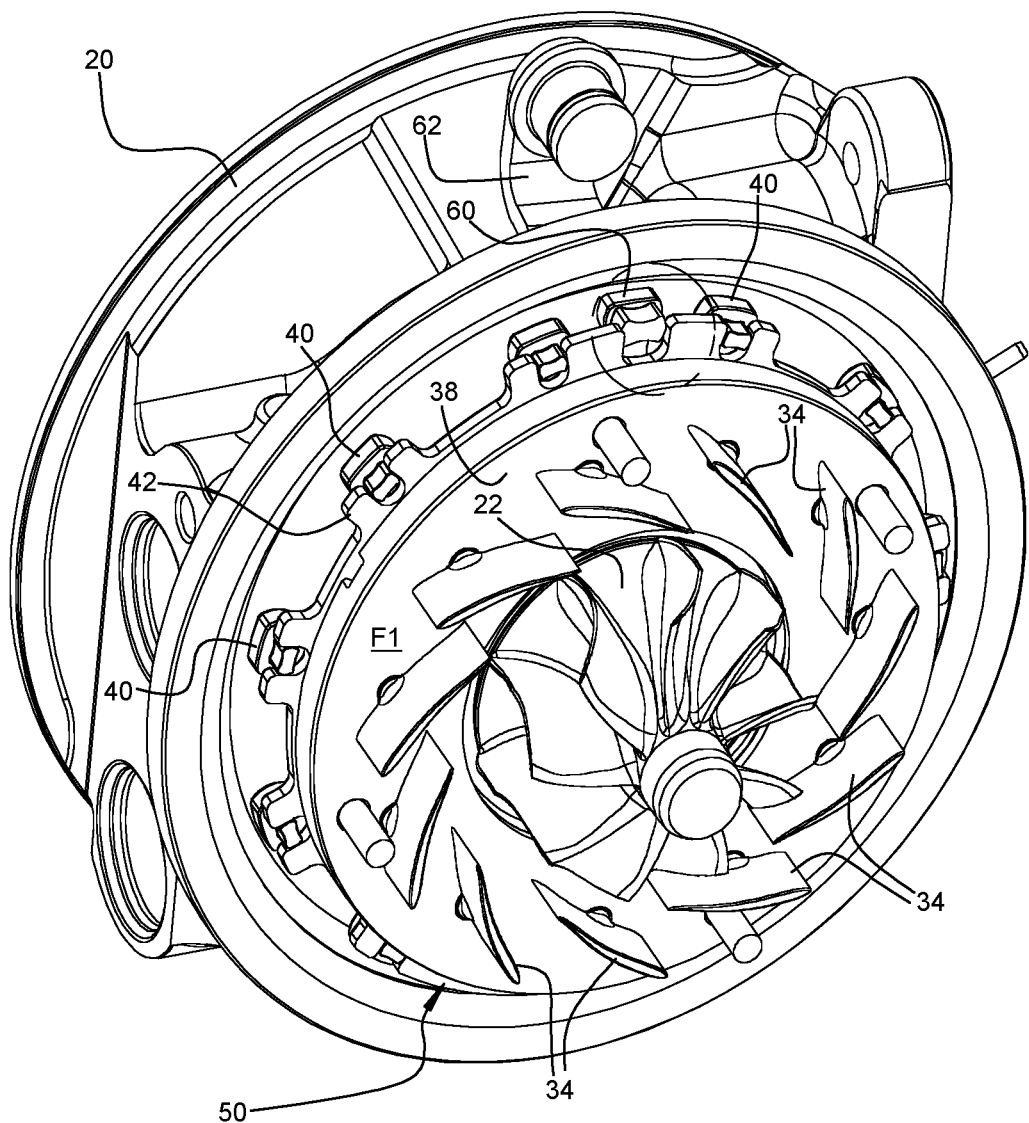
FIG. 12 is an isometric view of the sub-assembly of FIG. 11.

With reference to FIGS. 10 and 10A, the features of the nozzle ring 38 that allow it to cooperate with the heat shield 80 are now described. The nozzle ring has a first face F1 that forms one wall of the turbine nozzle and is adjacent to the variable vanes 34 (FIG. 12). The opposite second face F2 is adjacent to the vane arms 40 and unison ring 42 (FIG. 9). Adjacent the second face, the nozzle ring defines a radially inner peripheral surface 39 and a second catch C2 projecting radially inwardly from said radially inner peripheral surface. The minimum diameter of the second catch is smaller than the largest diameter defined by the prongs 84 at the radially outer periphery of the heat shield 80. The prongs 84 are resiliently deformable. The nozzle ring's inner periphery at the second face F2 defines a conical ramp surface starting from a relatively larger diameter and proceeding to the minimum diameter of the second catch in the direction toward the turbine wheel. Accordingly, axially pushing the cartridge 50 against the heat shield 80, toward the center housing, causes the prongs 84 at the outer periphery of the heat shield to be resiliently deformed radially inwardly by the ramp surface on the nozzle ring until the prongs clear the second catch C2, whereupon the prongs return at least partway to their relaxed state so that the cartridge is retained in connection with the center housing, as shown in FIGS. 11 and 11A.

FIG. 12 shows the sub-assembly comprising the center housing 20, rotor assembly (of which only the turbine wheel 22 is visible in FIG. 12), and variable vane cartridge 50 ready to be assembled with the turbine wheel. Also shown in FIG. 12 is a main arm 62 for imparting rotational motion to the unison ring 42. An end 60 of the main arm engages a notch in the outer periphery of the unison ring. The vane arms 40 also engage respective notches in the outer periphery of the unison ring. Rotation of the main arm 62 in one direction or another imparts rotation to the unison ring in one direction or another, and such motion is translated into pivoting of the vanes 34 via the vane arms 40.

Now a method for assembling the sub-assembly of the center housing 20 and variable vane cartridge 50 with the turbine housing 24 will be described. The turbine housing is supported on a stable surface with the receptacle for the turbine wheel 22 facing upward, and the sub-assembly is oriented vertically above the turbine housing with the cartridge 50 at the lower end.

Figure 13:
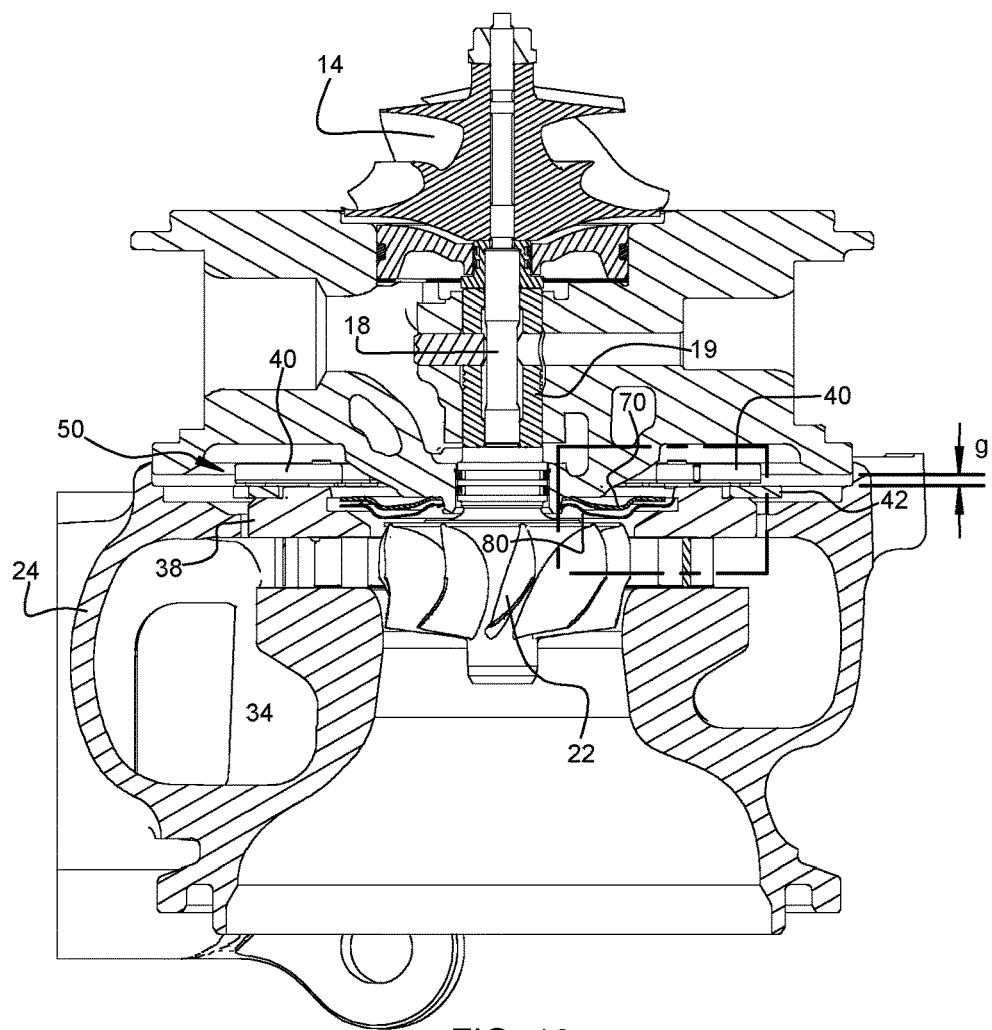
FIG. 13 illustrates the sub-assembly of FIGS. 11 and 12 having been partially lowered so that the turbine wheel enters the receptacle in the turbine housing, the spring shroud being in a relaxed state.
Figure 13A:
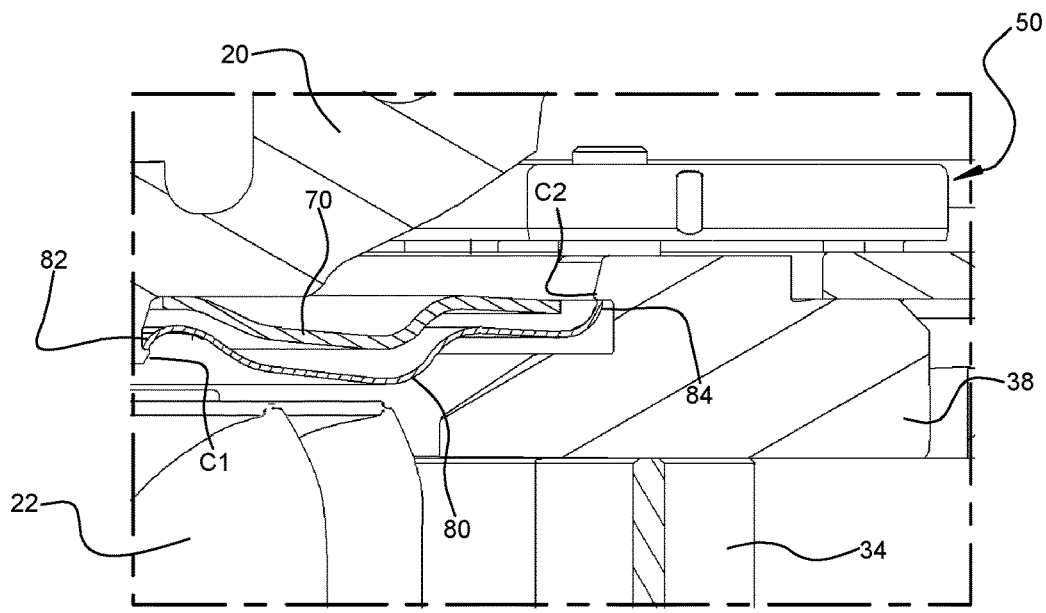
FIG. 13A is a magnified portion of FIG. 13.

As illustrated in FIGS. 13 and 13A, the sub-assembly is then partially lowered so that the turbine wheel 22 enters the receptacle defined in the turbine housing 24. At this stage, the spring shroud 70 remains in a relaxed, non-compressed state as best seen in FIG. 13A, because the sub-assembly has not yet been fully lowered until an axially facing surface of the center housing 20 abuts an opposing axially facing surface of the turbine housing 24, as indicated by the gap g in FIG. 13.

Figure 14:
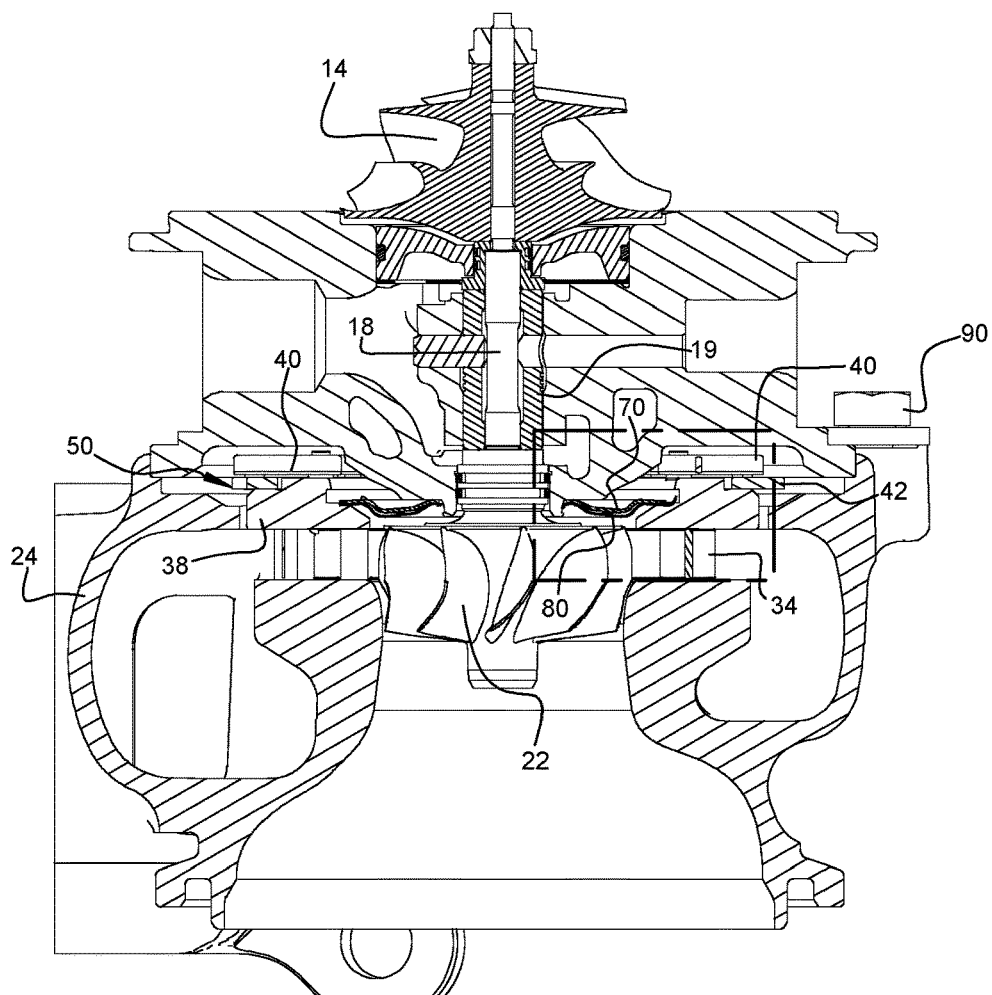
FIG. 14 is similar to FIG. 13, but shows the sub-assembly having been fully lowered into the turbine housing, the spring shroud being axially compressed between the center housing and the nozzle ring.
Figure 14A:
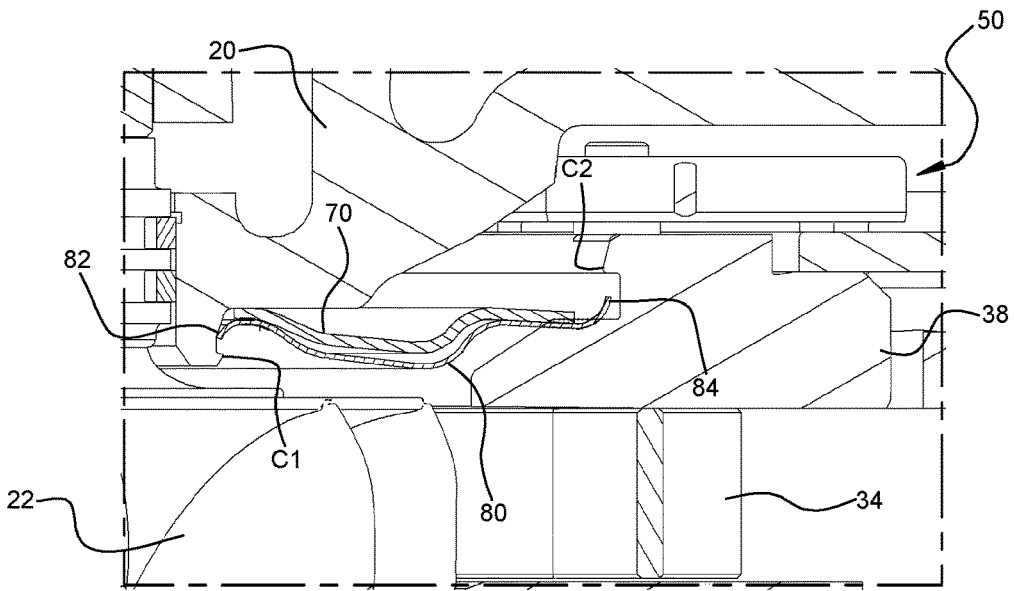
FIG. 14A is a magnified portion of FIG. 14.

FIGS. 14 and 14A illustrate a further, complete lowering of the sub-assembly into the turbine housing such that the gap g is reduced to zero. This results in the spring shroud 70 and the heat shield 80 being axially compressed between the center housing 20 and the nozzle ring 38. The spring shroud and heat shield assembly exert a restoring force axially on the nozzle ring 38 toward the turbine housing, which helps keep the variable vane cartridge in the correct axial location with respect to the turbine housing. Fasteners 90 are employed to fasten the center housing to the turbine housing. Further steps are then taken to complete the assembly of the turbocharger, including joining of a compressor housing (not shown) to the other end of the center housing.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of assembling a turbocharger having a vaned turbine nozzle, comprising the steps of:

providing a rotor assembly comprising a center housing defining a central bore extending therethrough and having bearings housed within the bore, a shaft rotatably supported by the bearings and having a first end extending out from one end of the bore and an opposite second end extending out from an opposite end of the bore, a compressor wheel connected to the first end of the shaft, and a turbine wheel connected to the second end of the shaft, wherein the center housing defines a nose portion at said opposite end of the bore, the nose portion defining a radially outer peripheral surface and a first catch projecting radially outwardly from said radially outer peripheral surface;

providing a vane assembly comprising a generally annular nozzle ring having a first face and an opposite second face, and an array of circumferentially spaced vanes adjacent said first face of the nozzle ring, wherein the nozzle ring defines a radially inner peripheral surface and a second catch projecting radially inwardly from said radially inner peripheral surface adjacent said second face of the nozzle ring;

providing an annular heat shield having an inner periphery and an outer periphery;

forming a first snap fit between the inner periphery of the heat shield and the first catch on the nose of the center housing so as to form a captive connection of the heat shield to the center housing;

forming a second snap fit between the outer periphery of the heat shield and the second catch on the nozzle ring so as to form a captive connection of the vane assembly to the center housing, thereby forming a rotor-and-vane assembly comprising the rotor assembly coupled with the vane assembly; and moving the rotor-and-vane assembly as a unit toward a turbine housing defining a receptacle, so as to move the turbine wheel into the receptacle in the turbine housing, and fastening the rotor-and-vane assembly to the turbine housing.

2. The method of claim 1, further comprising the step, performed prior to the forming steps, of positioning an annular spring shroud between the heat shield and an axially facing surface of the center housing, wherein the forming steps result in the spring shroud being captively retained between the heat shield and said axially facing surface of the center housing.

3. The method of claim 2, wherein the moving step causes said axially facing surface of the center housing to engage and axially bias an inner peripheral region of the spring shroud toward the turbine housing so as to cause an outer peripheral region of the spring shroud to engage and axially bias an outer peripheral region of the heat shield against a surface of the nozzle ring such that the spring shroud and the heat shield are axially compressed between the center housing and the nozzle ring.

4. The method of claim 1, wherein the moving step comprises orienting the turbine housing with the receptacle facing upward and orienting the rotor-and-vane assembly vertically with the turbine wheel facing downward and spaced above the turbine housing, and lowering the rotor-and-vane assembly until the turbine is disposed within the receptacle.

5. A turbocharger having a vaned turbine nozzle, comprising:

a rotor assembly comprising a center housing defining a central bore extending therethrough and having bearings housed within the bore, a shaft rotatably supported by the bearings and having a first end extending out from one end of the bore and an opposite second end extending out from an opposite end of the bore, a compressor wheel connected to the first end of the shaft, and a turbine wheel connected to the second end of the shaft, wherein the center housing defines a nose portion at said opposite end of the bore, the nose portion defining a radially outer peripheral surface and a first catch projecting radially outwardly from said radially outer peripheral surface;

a vane assembly comprising a generally annular nozzle ring having a first face and an opposite second face, and an array of circumferentially spaced vanes adjacent said first face of the nozzle ring, wherein the nozzle ring defines a radially inner peripheral surface and a second catch projecting radially inwardly from said radially inner peripheral surface adjacent said second face of the nozzle ring;

an annular heat shield having an inner periphery and an outer periphery, wherein the inner periphery of the heat shield engages the first catch on the nose of the center housing in a snap fit therebetween so as to form a captive connection of the heat shield to the center housing, and wherein the outer periphery of the heat shield engages the second catch on the nozzle ring in a snap fit therebetween so as to form a captive connection of the vane assembly to the center housing; and a turbine housing defining a receptacle, the turbine wheel being disposed within the receptacle, the turbine housing being fastened to the center housing.

6. The turbocharger of claim 5, wherein the inner periphery of the heat shield defines a plurality of circumferentially spaced first prongs that form the snap fit with the first catch.

7. The turbocharger of claim 6, wherein the outer periphery of the heat shield defines a plurality of circumferentially spaced second prongs that form the snap fit with the second catch.

8. The turbocharger of claim 5, further comprising an annular spring shroud disposed between the heat shield and an axially facing surface of the center housing, wherein the spring shroud and the heat shield are axially compressed between the center housing and the nozzle ring.

9. The turbocharger of claim 5, wherein the vane assembly comprises a variable-vane assembly, each vane being rotatably mounted to the nozzle ring, and comprising a rotatable unison ring disposed adjacent a second face of the nozzle ring opposite from the first face, with linkages connecting each vane to the unison ring such that rotation of the unison ring rotates the vanes about respective pivot axes thereof.

\* \* \* \* \*